(12) United States Patent
Brueggen et al.

(10) Patent No.: US 6,502,645 B1
(45) Date of Patent: Jan. 7, 2003

(54) FOLDING AGRICULTURAL IMPLEMENT FRAME

(75) Inventors: Shane Julius Brueggen, Ankeny, IA (US); Adam Richard Menze, Ankeny, IA (US); Michael Jeffrey Austin, Johnston, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/707,552

(22) Filed: Nov. 7, 2000

(51) Int. Cl.[7] .................................................. A01B 49/00
(52) U.S. Cl. ........................................ 172/311; 111/57
(58) Field of Search ................................ 172/311, 452, 172/456, 457, 459, 669, 776, 397; 111/52, 53, 54, 57

(56) References Cited

U.S. PATENT DOCUMENTS

| | | | |
|---|---|---|---|
| 4,137,852 A | 2/1979 | Pratt | 111/57 |
| 4,364,581 A | * 12/1982 | Shoup | |
| 4,504,076 A | 3/1985 | Bedney | 280/411 |
| 4,518,046 A | 5/1985 | Rettig et al. | 172/311 |
| 4,582,143 A | 4/1986 | Pratt | 172/311 |
| 4,596,290 A | 6/1986 | Bedney | 172/311 |
| 4,607,708 A | 8/1986 | Landphair et al. | 172/776 |
| 4,664,202 A | * 5/1987 | Applequist et al. | |
| 5,232,054 A | * 8/1993 | Van Blaricon et al. | |
| 5,488,996 A | * 2/1996 | Barry et al. | |
| 5,626,196 A | * 5/1997 | Hughes | |
| 5,802,995 A | * 9/1998 | Baugher et al. | |
| 5,839,378 A | * 11/1998 | Stufflebeam et al. | |
| 6,076,613 A | * 6/2000 | Frasier | |

FOREIGN PATENT DOCUMENTS

| | | | | |
|---|---|---|---|---|
| AU | 282278 | * | 9/1966 | 172/311 |
| EP | 155689 | * | 9/1985 | 172/311 |
| FR | 2483731 | * | 12/1981 | 172/311 |

OTHER PUBLICATIONS

Great Plains, Solid Stand 3–Section Folding Drill brochure, May 1, 1986, 4 pages.*

* cited by examiner

Primary Examiner—Victor Batson

(57) ABSTRACT

A towed agricultural implement frame comprises a main frame, and right and left wing frame sections that are coupled to one another by right and left pivot frames. The pivot frames are pivotally coupled to the main frame by right and left vertical pivots and to the wing frame sections by right and left horizontal pivots. The wing frame sections can be folded forwardly by right and left folding hydraulic cylinders. As the wing sections are folded forwardly towards the main frame draw bar, right and left rollers on the outermost ends of the wing frame sections engage right and left ramps mounted on the draw bar. Further retraction of the folding hydraulic cylinders lifts the outermost ends of the wing sections by moving the rollers up the ramps. Lift hydraulic cylinders located between the main frame and a wheel frame raise the main frame. The main frame also lifts the innermost ends of the right and left wing frame sections.

15 Claims, 4 Drawing Sheets

FOLDING AGRICULTURAL IMPLEMENT FRAME

BACKGROUND OF THE INVENTION

1. Field of the Invention

The present invention is directed to a towed agricultural implement frame having a ramp mounted to the draw bar for raising forwardly folded wing frame sections.

2. Description of the Prior Art

Towed agricultural implement frames are used to support seeding implements, chemical application implements and cultivating implements. Typically these frames have a transversely extending working configuration and a longitudinally extending transport configuration. In recent years the working width of these frames has been increasing to allow the farmer to cover more area with a single pass. It is important that the frame sections flex, with respect to one another, at least to a limited degree, so they can better follow ground contours. In the transport configuration the frame sections are aligned along a longitudinal axis that is parallel to the draw bar axis. This narrower transport configuration facilitates transport of the frame from one field to another.

One design for these frames is the front fold frame. A front fold frame is provided with right and left wing sections that fold forwardly about a vertical pivot. These wing sections are then raised by hydraulic cylinders and latched to each other and/or the draw bar during transport. Front fold frames may or may not be provided with a center frame section on which is mounted an agricultural implement.

SUMMARY

A towed agricultural implement frame having a transversely extending working configuration and a longitudinally extending transport configuration, comprises a main frame and right and left wing frame sections that are coupled to one another by right and left pivot frames. The pivot frames are pivotally coupled to the main frame by right and left vertical pivots and to the wing frame sections by right and left horizontal pivots. The wing frame sections can be folded forwardly by right and left folding hydraulic cylinders. As the wing sections are folded forwardly towards the main frame draw bar, right and left rollers on the outermost ends of the wing frame sections engage right and left ramps mounted on the draw bar. Further retraction of the folding hydraulic cylinders lifts the outermost ends of the wing sections by moving the rollers up the ramps. Lift hydraulic cylinders located between the main frame and a wheel frame raise the main frame. As the main frame is lifted, the right and left pivot frames lift the innermost ends of the right and left wing frame sections.

DETAILED DESCRIPTION

Figure 1:
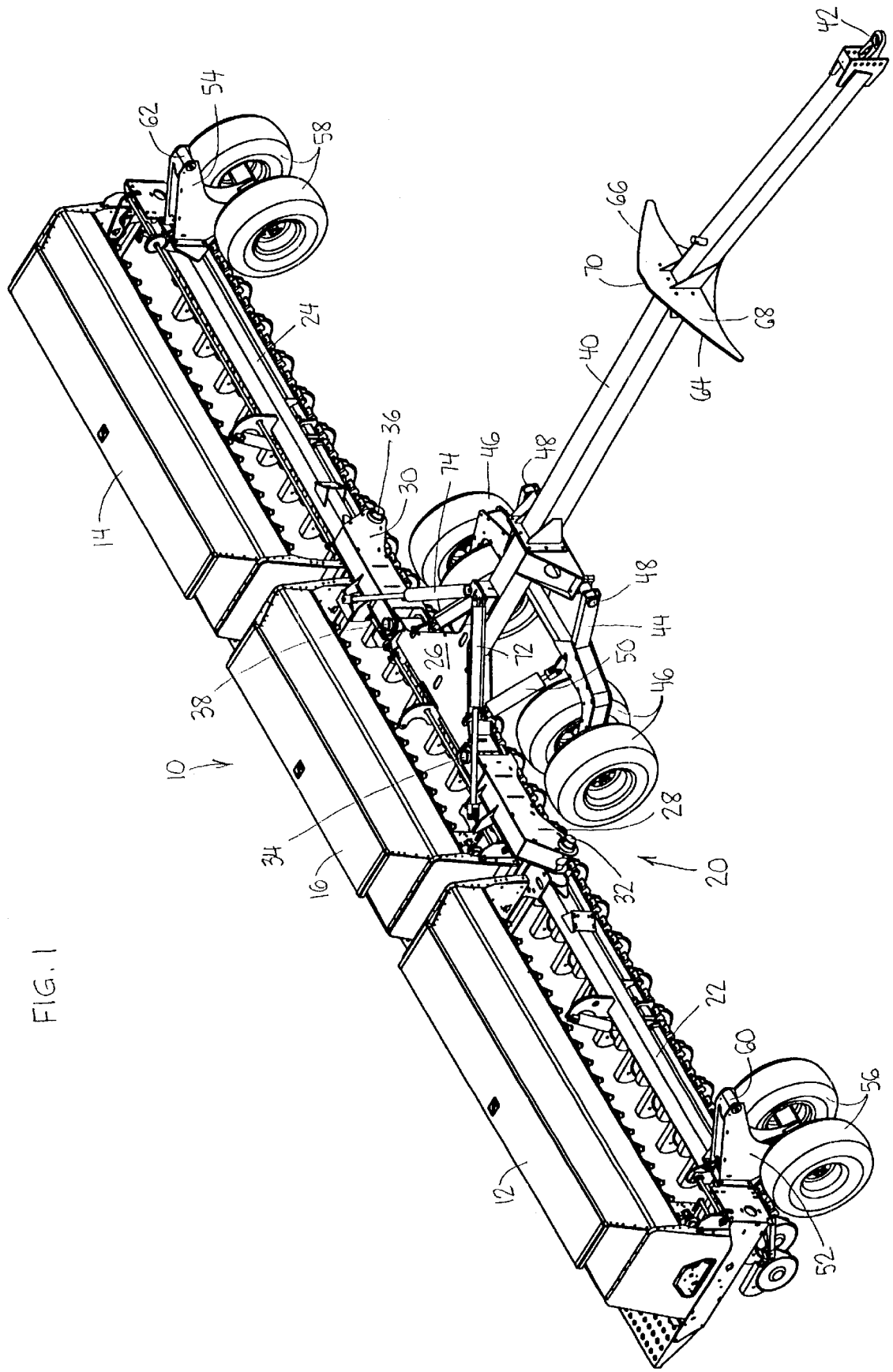
FIG. 1 is a three working section implement frame in its working configuration.
Figure 2:
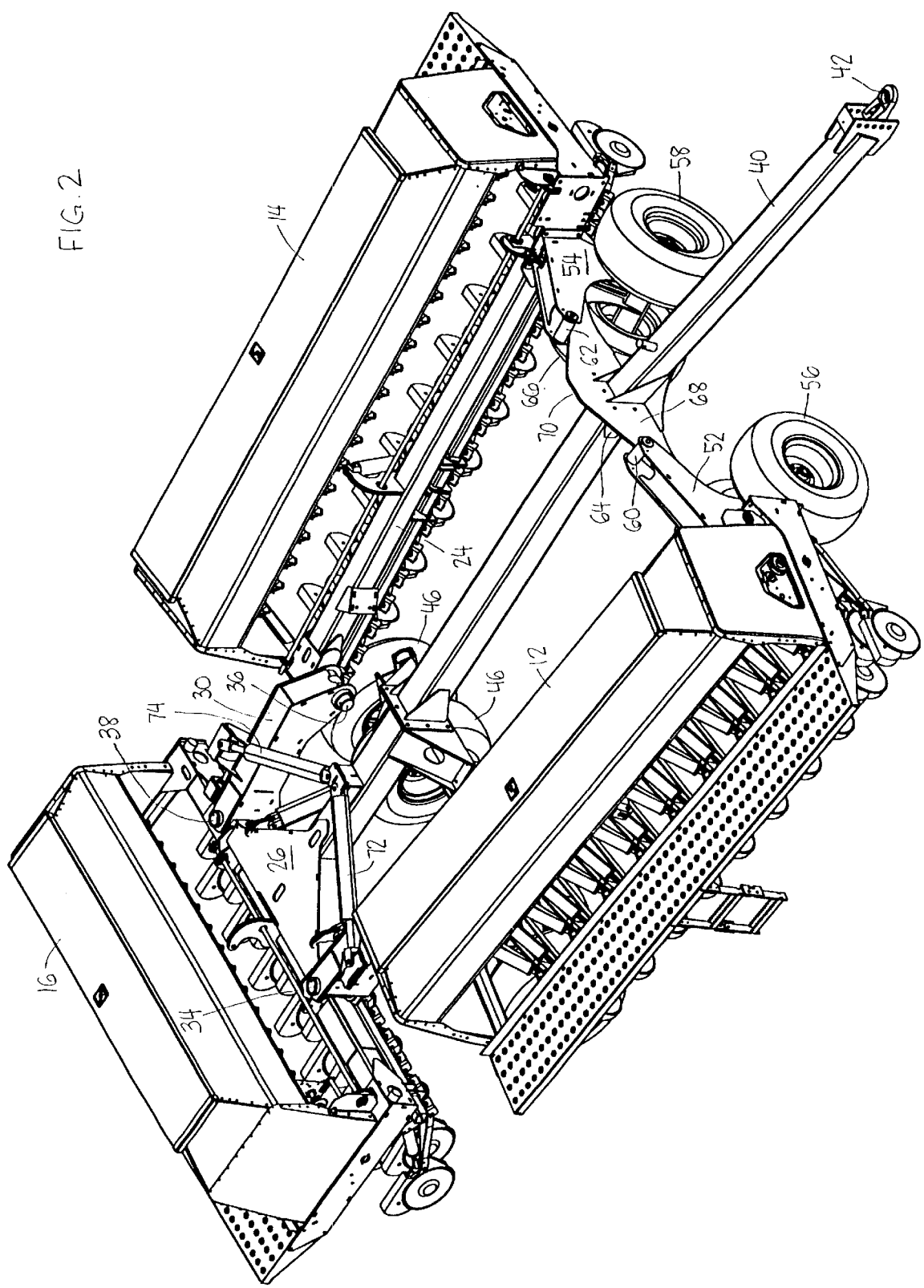
FIG. 2 is a three working section implement frame in an intermediate position between its working configuration and its transport configuration.
Figure 3:
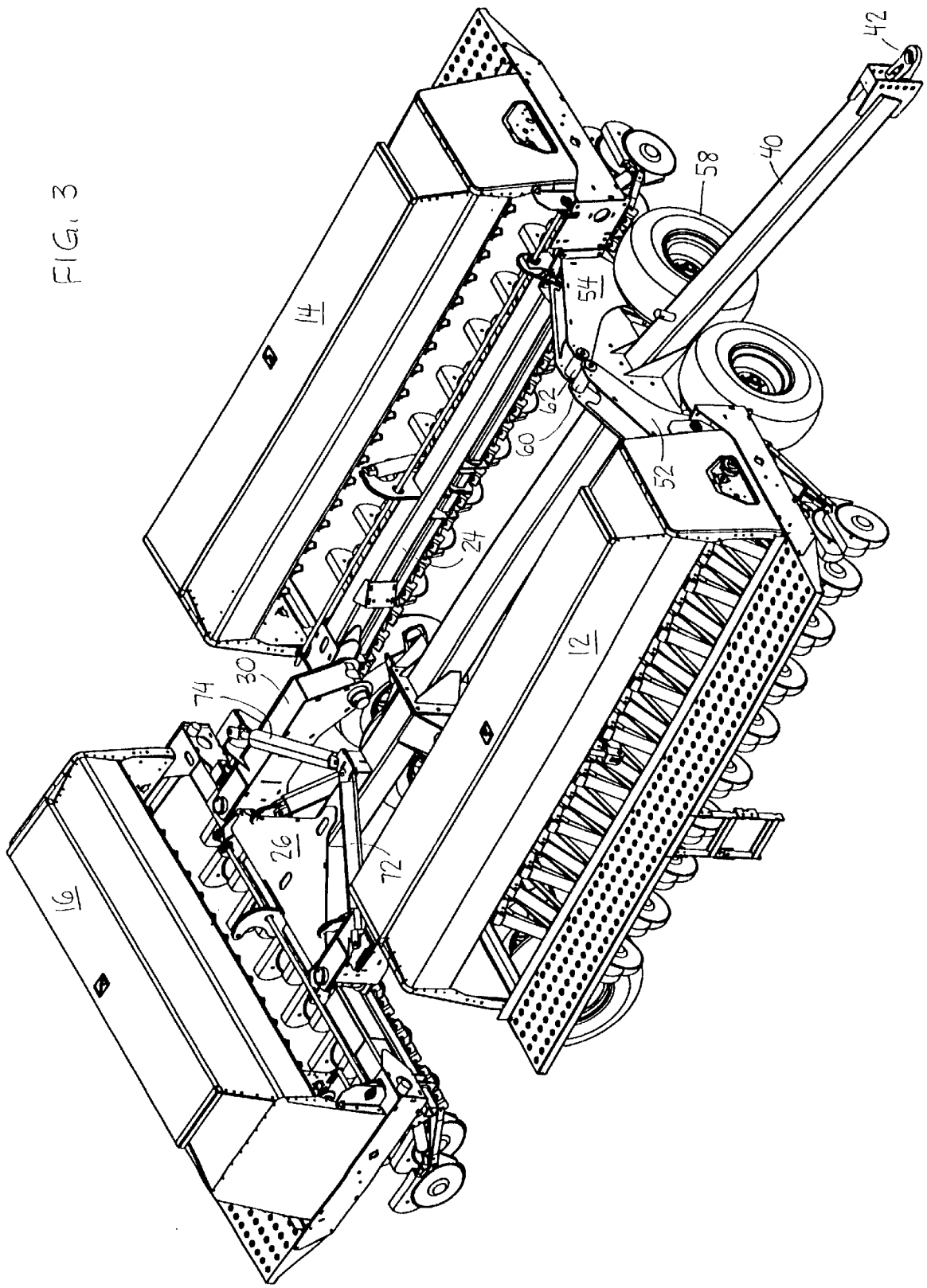
FIG. 3 is a three working section implement frame in its transport configuration.
Figure 4:
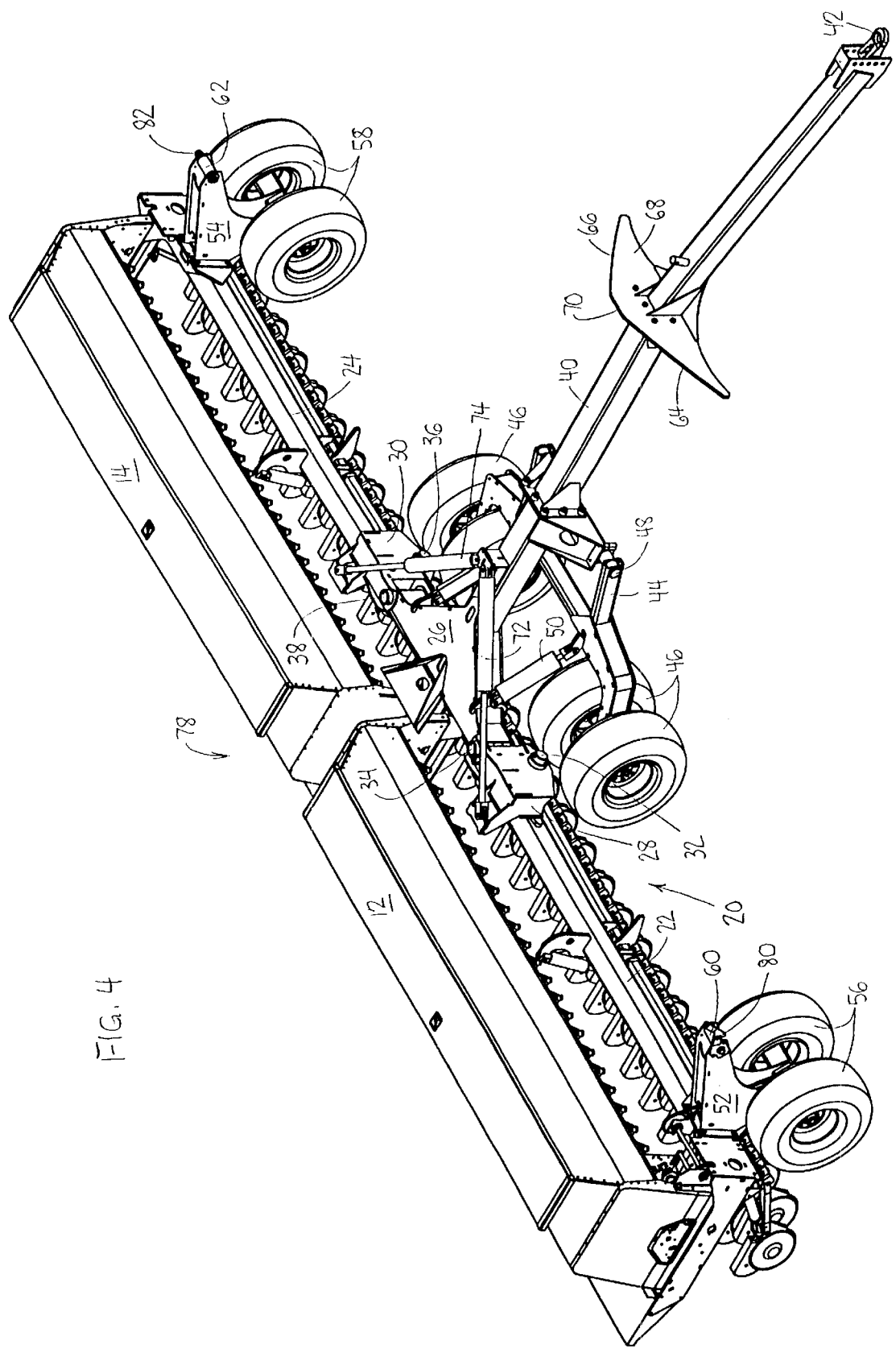
FIG. 4 is a two working section implement frame in its working configuration.

FIG. 1 illustrates a three working section grain drill 10 supported on a towed implement frame 20. The grain drill has right and left wing sections 12 and 14, and a central section 16. The right and left wing sections 12 and 14 are mounted to right and left wing frame sections 22 and 24 of the towed implement frame 20. Similarly, the central frame section 16 is mounted to main frame 26 of the towed implement frame 20. Although FIGS. 1–3 illustrate the present towed implement frame as supporting a three section agricultural implement, the present invention can also be used on a two section implement, as illustrated in FIG. 4. In addition the present invention can be used on other seeding equipment, for example row crop planters and air seeders, and other agricultural equipment, for example field cultivators and chemical applicators.

The right and left wing frame sections 22 and 24 are coupled to the main frame 26 by right and left pivot frames 28 and 30. The innermost end of the right wing frame section 22 is pivotally coupled to the first end of the right pivot frame 28 by a right horizontal pivot 32. The other end of the right pivot frame 28 is pivotally coupled to the main frame 26 about a right vertical pivot 34. The innermost end of the left wing frame section 24 is pivotally coupled to the first end of the left pivot frame 30 by a left horizontal pivot 36. The other end of the left pivot frame 30 is pivotally coupled to the main frame 26 about a left vertical pivot 38. As shown in FIG. 1, the pivot axes of the right and left horizontal pivots 32 and 36 extend parallel to one another in a fore/aft direction when the towed implement frame 20 is in its working configuration. When the towed implement frame 20 is in its transport configuration, illustrated in FIG. 3, the pivot axes of the right and left horizontal pivots extend transversely to the line of travel.

The main frame 26 is provided with a forwardly extending draw bar 40. The forward end of the draw bar 40 is provided with a hitch 42 for attachment to a tractor. The main frame 26 is supported on a wheel frame 44. The wheel frame 44 is provided with ground engaging wheels 46. The wheel frame 44 is pivotally coupled to the main frame 26 by a transverse pivot 48. Two hydraulic lift cylinders 50 extend between the wheel frame 44 and the main frame 26 for lifting the main frame 26 relative to the wheel frame 44.

The outermost ends of the right and left wing frame sections 22 and 24 are provided with right and left vertical supports 52 and 54. The bottoms of the right and left vertical supports 52 and 54 are provided with right and left ground engaging wing section wheels 56 and 58. The tops of the right and left vertical supports 52 and 54 are provided with right and left ramp engaging members 60 and 62. In the illustrated embodiment, the ramp engaging members 60 and 62 are rollers, however the ramp engaging members may assume other configurations like bearing plates and slide mechanisms. The innermost ends of the right and left wing frame sections 22 and 24 are supported by the ground engaging main wheels 46 through the main frame section 26 and the right and left pivot frames 28 and 30. The outermost ends of the right and left wing frame sections 22 and 24 are supported on right and left wing section wheels 56 and 58.

The draw bar 40 is provided with a right ramp 64 and a left ramp 66 formed from a triangular plate 68. The triangular plate 68 is rigidly mounted to draw bar 40. The apex of the triangular plate 68 is provided with a depression 70 forming a detent. Right and left folding hydraulic cylinders 72 and 74 are used to pivot the right and left wing frame sections 22 and 24 on right and left vertical pivots 34 and 38. The right and left folding hydraulic cylinders 72 and 74 extend between the main frame 26 and the right and left pivot frames 28 and 30.

When folding the implement frame 20 from its working configuration to its transport configuration, the hydraulic lift cylinders 50 are extended lifting the main frame 26, next the right and left folding hydraulic cylinders 72 and 74 are retracted, pivoting the right and left wing frame sections 22 and 24 forwardly on the right and left vertical pivots 34 and 38. The vertical movement of the main frame 26 lifts the right and left pivot frames 28 and 30, and the innermost ends of the right and left wing frame sections 22 and 24. As the right and left wing frame sections 22 and 24 are forwardly pivoted, the right and left ramp engaging members 60 and 62 contact the right and left ramps 64 and 66. Further retraction of the right and left folding hydraulic cylinders 72 and 74 raises the outermost end of the right and left wing sections 22 and 24 upwardly on the ramps 64 and 66. The rollers of the ramp engaging members 60 and 62 roll up the ramps 64 and 66 and are latched into the detent formed by depression 70. Suitable mechanical and/or hydraulic latching assemblies can be used to further latch the wing frame sections 22 and 24 to one another and/or to the draw bar 40. One example of a mechanical latch assembly is illustrated in FIG. 4 and discussed below.

As shown in FIG. 4 the present implement frame 20 can be used for folding a two-section implement 78. In this embodiment, the pivot frame sections 28 and 30 are smaller as they do not have to leave room for the center section 16. The right vertical support 52 is provided with a gravity biased hook 80 that automatically engages bolt extension 82 of left roller 62 when the implement frame 20 is placed in its transport configuration. The hook 80 and the bolt extension 82 form a latch that latches the right wing frame section 22 to the left wing frame section 24.

The invention should not be limited by the above-described embodiments, but should be limited solely by the claims that follow:

We claim:

1. A towed agricultural implement frame having a transversely extending working configuration and a longitudinally extending transport configuration, the frame comprising:
   a main frame having a forwardly extending draw bar, the draw bar having a right ramp and a left ramp;
   ground engaging main wheels mounted to a wheel frame, the wheel frame is pivotally coupled to the main frame;
   a right pivot frame is pivotally coupled to the main frame about a right vertical pivot;
   a right wing frame section having an innermost end pivotally coupled to the right pivot frame about a horizontally extending right pivot, the right wing frame having an outermost end being provided with a right vertical support, a ground engaging right wing wheel is rotatively mounted to the right vertical support and a right ramp engaging member is mounted on the right vertical support;
   a left pivot frame is pivotally coupled to the main frame about a left vertical pivot;
   a left wing frame section having an innermost end pivotally coupled to the left pivot frame about a horizontally extending left pivot, the left wing frame having an outermost end being provided with a left vertical support, a ground engaging left wing wheel is rotatively mounted to the left vertical support and a left ramp engaging member is mounted on the left vertical support;
   lift hydraulic cylinders for lifting the main frame relative to the wheel frame;
   right and left folding hydraulic cylinders pivot the left and right wing frames forwardly about the right and left vertical pivots, as the implement frame is moved from its working configuration to its transport configuration the right and left ramp engaging members engage the right and left ramps lifting the outermost ends of the right and left wing frames.

2. An implement frame as defined by claim 1 wherein the right and left ramp engaging members comprise right and left rollers.

3. An implement frame as defined by claim 2 wherein the right and left ramps are formed on a triangular plate mounted to the draw bar.

4. An implement frame as defined by claim 3 wherein the triangular plate has an apex, the apex being provided with a detent for holding the right and left rollers when said implement frame is in the transport configuration.

5. An implement frame as defined by claim 4 wherein the main frame is provided with a center frame section for receiving an agricultural implement.

6. An implement frame as defined by claim 2 wherein the ramps extend transversely from the draw bar.

7. An implement fame as defined by claim 6 wherein the right folding hydraulic cylinder is positioned between the main frame and the right pivot frame, and the left folding hydraulic cylinder is posited between the main frame and the left pivot frame.

8. An implement frame as defined by claim 7 wherein the lift hydraulic cylinders are positioned between the wheel frame and the main frame.

9. A towed agricultural implement frame having a transversely extending working configuration and a longitudinally extending transport configuration, the frame comprising:
   a main frame having a forwardly extending draw bar, the draw bar having a right ramp and a left ramp;
   ground engaging main wheels being operatively coupled to the main frame;
   a right pivot frame is pivotally coupled to the main frame;
   a right wing frame section having an innermost end is pivotally coupled to the right pivot frame, the right wing frame having an outermost end being provided with a right vertical support, a ground engaging right wing wheel is rotatively mounted to the right vertical support and a right ramp engaging member is mounted on the right vertical support;
   a left pivot frame is pivotally coupled to the main frame;
   a left wing frame section having an innermost end pivotally coupled to the left pivot frame, the left wing frame having an outermost end being provided with a left vertical support, a ground engaging left wing wheel is rotatively mounted to the left vertical support and a left ramp engaging member is mounted on the left vertical support;
   lift hydraulic cylinders for lifting the main frame;
   right and left folding hydraulic cylinders pivot the left and right wing frames forwardly, as the implement frame is moved from its working configuration to its transport configuration the right and left ramp engaging members engage the right and left ramps lifting the outermost ends of the right and left wing frames.

10. An implement frame as defined by claim 9, wherein the right and left ramp engaging members comprise right and left rollers.

11. An implement frame as defined by claim 10, wherein the right and left ramps are formed on a triangular plate mounted to the draw bar.

12. An implement frame as defined by claim 11, wherein the triangular plate has an apex, the apex being provided with a detent for holding the right and left rollers when said implement frame is in the transport configuration.

13. An implement frame as defined by claim 12 wherein the main frame is provided with a center frame section for receiving an agricultural implement.

14. An implement frame as defined by claim 10 wherein the ramps extend transversely from the draw bar.

15. An implement frame as defined by claim 14, wherein the right folding hydraulic cylinder is positioned between the main frame and the right pivot frame, and the left folding hydraulic cylinder is positioned between the main frame and the left pivot frame.

* * * * *